United States Patent [19]

Bunyi

[11] Patent Number: 5,632,687
[45] Date of Patent: May 27, 1997

[54] GOLF BALL DISPENSING APPARATUS

[76] Inventor: John F. Bunyi, 2603 Kelliwood Lakes Dr., Katy, Tex. 77450

[21] Appl. No.: 478,236

[22] Filed: Jun. 7, 1995

[51] Int. Cl.⁶ .................................................. A63B 57/00
[52] U.S. Cl. ............................ 473/137; 221/265; 221/301
[58] Field of Search .................................. 221/195, 196, 221/312 B, 312 R, 256, 257, 261, 265, 277, 301; 473/132, 137

[56] References Cited

U.S. PATENT DOCUMENTS

| | | | |
|---|---|---|---|
| 1,937,180 | 11/1933 | Young | 473/137 |
| 2,127,282 | 8/1938 | Beckett . | |
| 2,711,321 | 6/1955 | McGraw, Sr. . | |
| 3,127,177 | 3/1964 | Benkoe | 473/137 |
| 3,599,983 | 8/1971 | Melton | 273/201 |
| 4,017,087 | 4/1977 | Bruno . | |
| 4,141,558 | 2/1979 | Hoffman | 273/201 |
| 4,146,232 | 3/1979 | Stone | 473/137 |
| 4,360,204 | 11/1982 | Karr | 273/201 |
| 4,391,446 | 7/1983 | Eberle | 273/201 |
| 4,796,893 | 1/1989 | Choi | 473/137 |
| 4,892,318 | 1/1990 | Jennings | 473/137 |
| 4,957,296 | 9/1990 | Turnidge et al. | 473/137 |
| 4,995,614 | 2/1991 | Tange | 473/137 |
| 5,022,657 | 6/1991 | Bussiere et al. . | |
| 5,131,661 | 7/1992 | Jorgensen . | |
| 5,133,557 | 7/1992 | Sugimoto . | |
| 5,259,622 | 11/1993 | Irving | 473/132 |
| 5,282,628 | 2/1994 | Komori et al. . | |
| 5,297,797 | 3/1994 | Lamontagne . | |
| 5,322,291 | 6/1994 | Smith et al. . | |
| 5,330,194 | 7/1994 | Copeland . | |
| 5,346,222 | 9/1994 | Luther, Sr. | 473/137 |
| 5,549,518 | 8/1996 | Wang | 473/137 |

*Primary Examiner*—William E. Terrell
*Assistant Examiner*—Khoi H. Tran
*Attorney, Agent, or Firm*—Patterson & Streets, L.L.P.

[57] ABSTRACT

The present invention is directed to a golf ball dispensing apparatus. The invention includes a golf ball dispensing tube mounted on a base. The golf ball dispensing tube is provided with a release mechanism which may be actuated to sequentially release the golf balls. Each golf ball travels to the discharge end of the dispensing tube and drops into a pivotally mounted conveyor tube. The weight of the golf ball rotates the conveyor tube downward and positions the end of the conveyor tube over the tee for placing the golf ball on the tee.

15 Claims, 3 Drawing Sheets

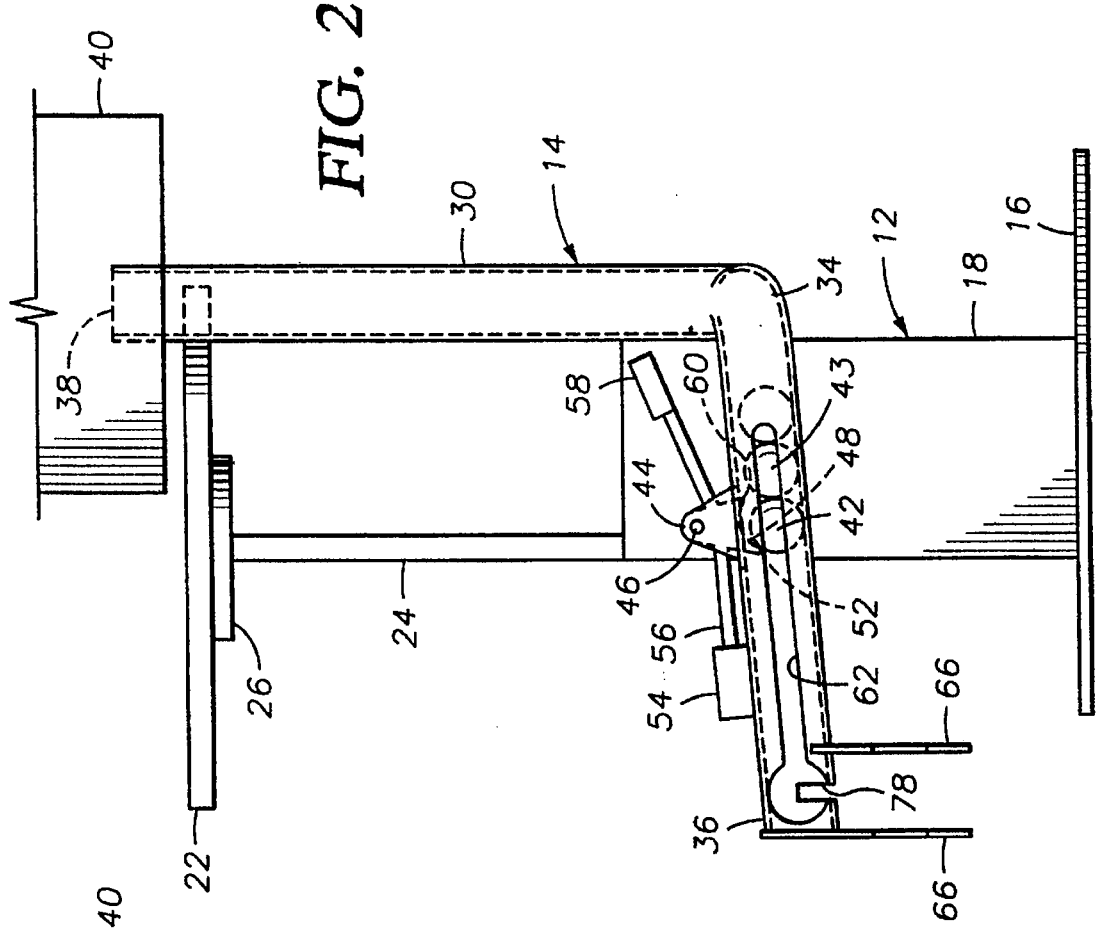
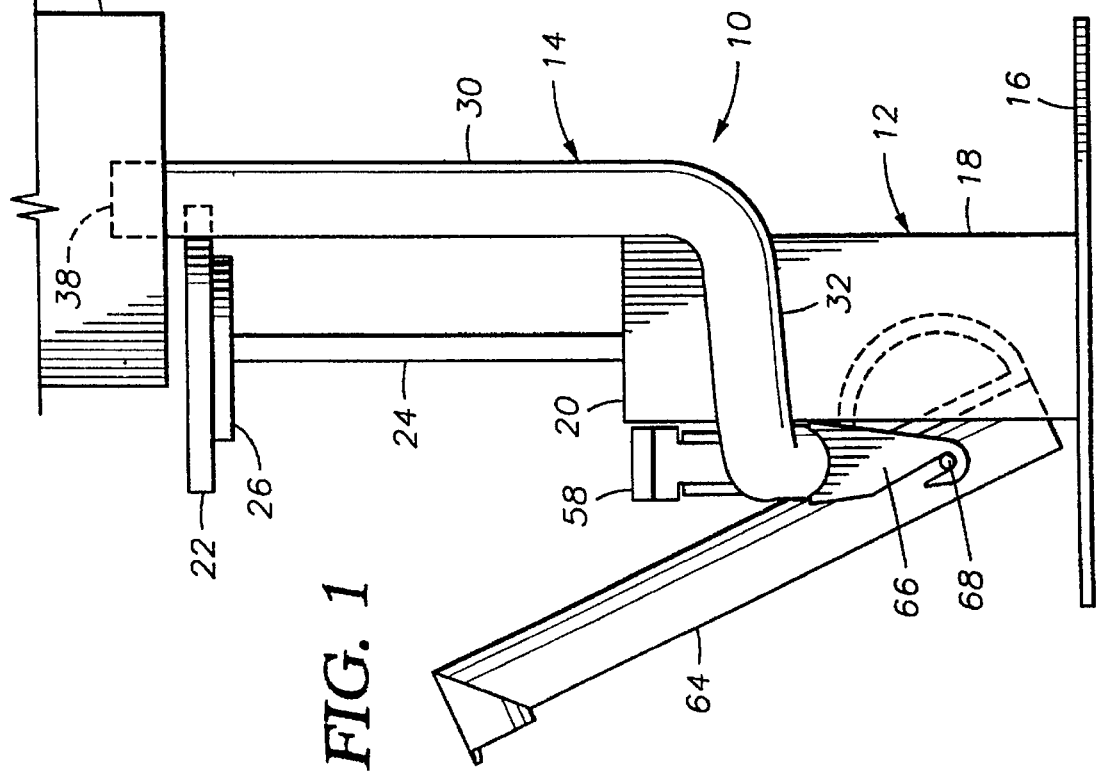

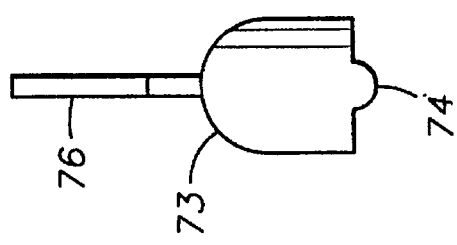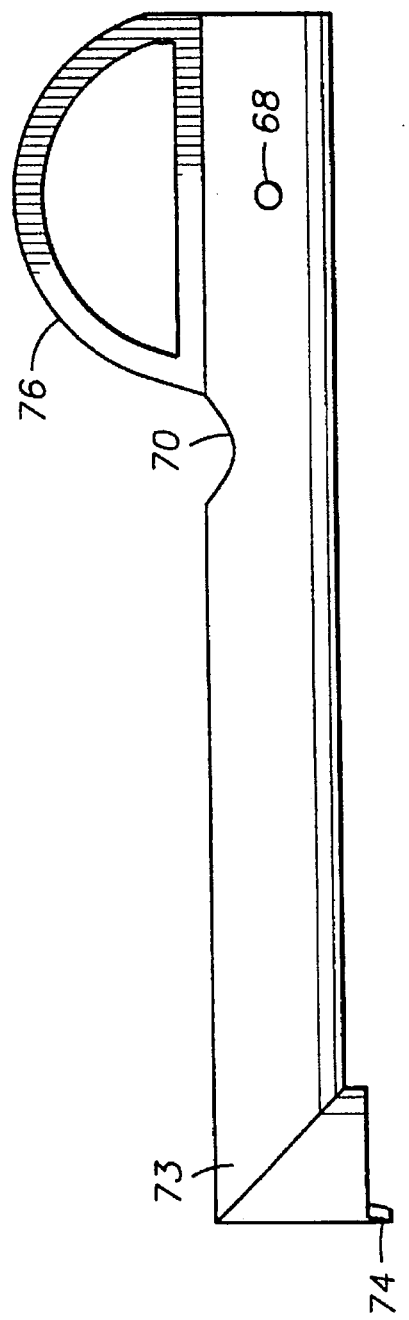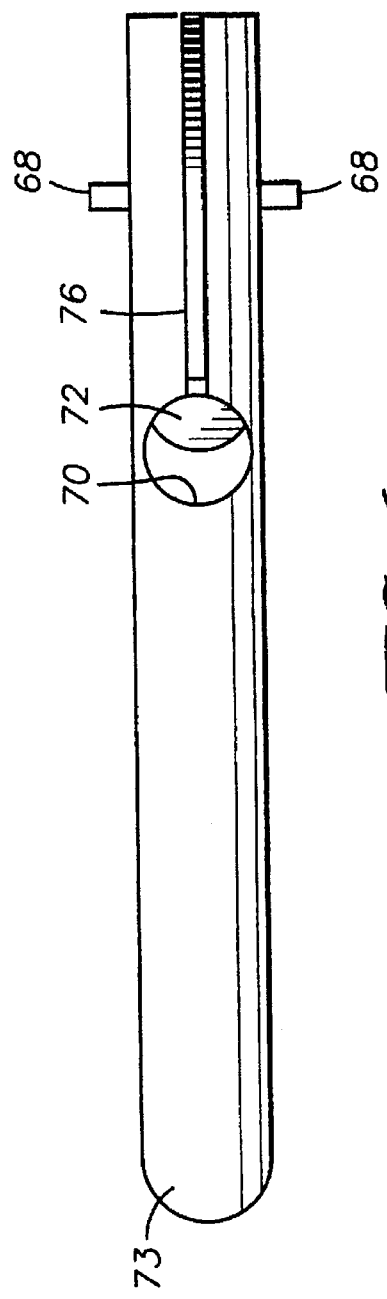

GOLF BALL DISPENSING APPARATUS

BACKGROUND OF THE DISCLOSURE

Field of the Invention

The present invention is directed to an apparatus for placing a golf ball on a golf tee, particularly, an apparatus which automatically dispenses golf balls and positions each golf ball on a tee upon actuation of a release mechanism by the golfer.

Background of the Invention

Golfers typically spend many hours practicing to improve their game, particularly at the driving range. A golfer may hit fifty or a hundred golf balls during a practice session at the driving range. During each practice session, the golfer retrieves a golf ball from a bucket of golf balls and sets the golf ball on the tee after each swing. Between each swing, the golfer must move away from the tee to retrieve another golf ball from the bucket and place it on the tee in preparation for the next swing. Proper foot placement and position of the body relative to the tee is critical to the development of a proper golf swing. Minor changes in the golf stance may be the difference between a perfect drive down the fairway or slicing the golf ball into the trees. One disadvantage with manually placing the golf ball on the tee between each swing is that it requires the golfer to move away from the tee to retrieve another golf ball. The golfer must then place the ball on the tee and again position himself relative to the tee. If the golfer resumes his original stance, he may again mis-hit the ball.

The apparatus of the present disclosure aids the golfer in developing his golf swing by automatically placing a golf ball on the tee between each swing. The golfer may concentrate on his golf stance between ball placement on the tee and make minor adjustments to his stance over the ball with each swing until he has developed his golf stance and swing.

It is therefore an object of the present invention to provide an apparatus for dispensing and placing a golf ball on a golfing tee upon actuation of a release mechanism by the golfer.

SUMMARY OF THE INVENTION

The present invention is directed to a golf ball dispensing apparatus. The invention includes a golf ball dispensing tube mounted on a base. The golf ball dispensing tube is provided with a release mechanism which may be actuated by the golfer to sequentially release golf balls for placement on the golf tee. Each golf ball travels to the discharge end of the dispensing tube and drops into a pivotally mounted conveyor tube. The weight of the golf ball as it rolls through the conveyor tube rotates the conveyor tube downwardly and thereby positions the end of the conveyor tube over the tee for placement of the golf ball on the tee.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a side view of the apparatus of the invention;

FIG. 2 is a front view of the apparatus of the invention showing the golf ball dispensing tube and release mechanism;

FIG. 5 is a side view of the conveyor tube of the invention;

FIG. 6 is a top view of the conveyor tube of the invention; and

FIG. 7 is an end view of the conveyor tube of the invention taken along line 7—7 of FIG. 5.

DESCRIPTION OF THE PREFERRED EMBODIMENT

Figure 4:
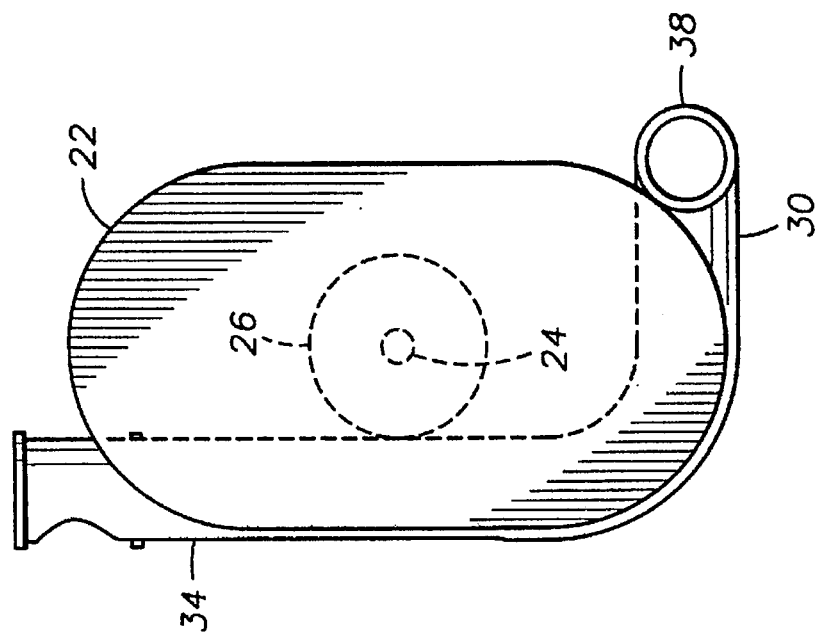
FIG. 4 is a top view of the base and dispensing tube of the invention.

Referring first to FIG. 1, the golf ball dispensing apparatus of the invention is generally identified by the reference number 10. The apparatus 10 includes a base 12 and a golf ball dispensing tube 14 mounted on the base 12. The tube 14 is preferably of stainless steel construction and is welded on the base 12. It is understood, however, that the base 12 and tube 14, as well as all of the components of the apparatus 10, may be fabricated of any suitable materials, for example, plastics.

The base 12 includes a base plate 16 welded or otherwise mounted to the lower end of the base 12. The base plate 16 defines a disk which extends radially outwardly approximately one foot beyond the sidewalls of the base 12 which is centrally located on the base plate 16. The base plate 16 provides stability to the apparatus 10 so that it does not easily tip over, even when the tube 14 is fully loaded with golf balls. The base plate may be mounted to a platform or concrete slab of a practice station.

The base 12 defines a box-like enclosure formed by sidewalls 18 and a top wall 20. The lower end of the base 12 is closed by the base plate 16. The sidewalls 18 are at right angles to each other forming the box-like profile of the base 12.

Referring still to FIG. 1, a tray 22 is supported above the base 12 on a pedestal formed by a leg support 24 and a support plate 26. The leg 24 is welded to the top wall 20 of the base 12 and extends vertically therefrom approximately 12 inches for supporting the tray 22 approximately two feet above the base plate 16. The tray 22 provides a convenient surface for the golfer to place personal items such as a drink, keys, change, or other loose items in his pocket that may hinder his golf swing.

Figure 3:
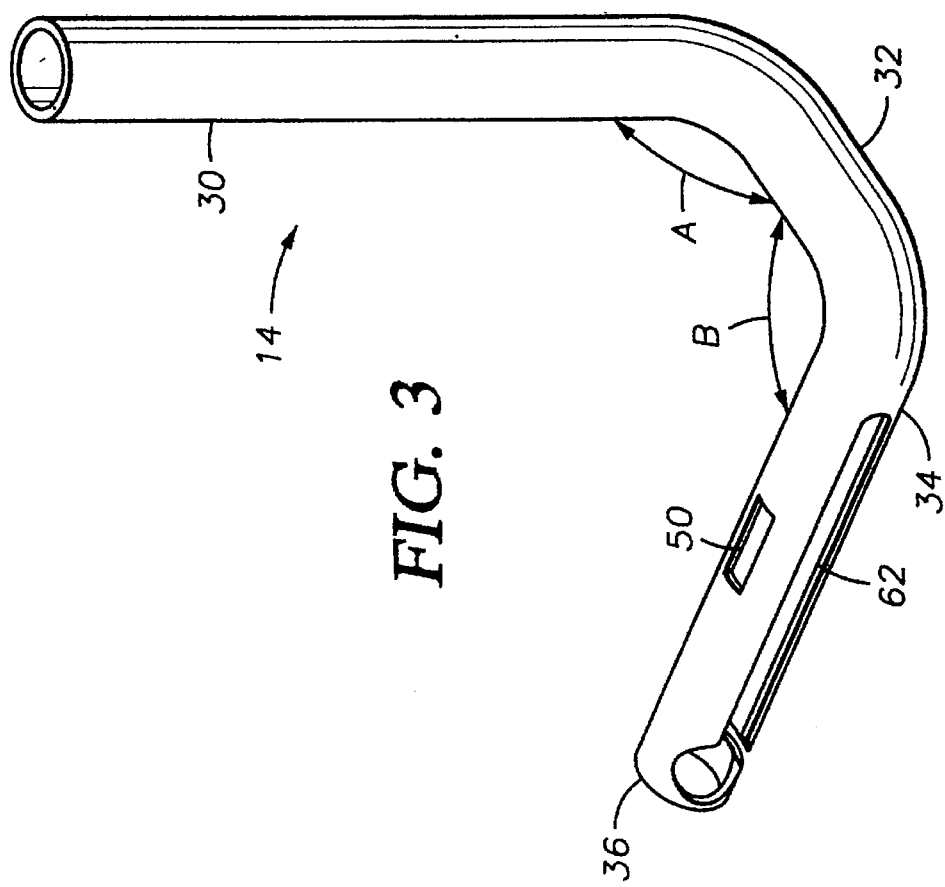
FIG. 3 is a perspective view of the dispensing tube of the invention.

Referring now to FIG. 3, the golf ball dispensing tube 14 is shown in greater detail in perspective view. The tube 14 defines a unitary tubular body comprising an upstanding tubular segment 30 approximately 18 inches in height which merges with a middle segment 32. The upright segment 30 and the middle segment 32 define an angle A in a vertical plane through the centerline of tube segments 30 and 32 of approximately 97°. The middle tube segment 32 drops about 7° from the horizontal as it merges with the lower tube segment 34. The middle tube segment 32 and lower tube segment 34 define an angle B in the horizontal plane through the centerline of tube segments 32 and 34 of approximately 90°. The lower tube segment 34 drops approximately 4° below horizontal to its discharge end 36.

Referring again to FIG. 1, the tube 14 is welded to the base 12 along the segments 32 and 34. The segment 30 of the tube 14 extends vertically above the base 12 about 18 inches. The uppermost end 38 of the tube 14 extends approximately 28 inches above the base plate 16. A golf ball magazine 40 is mounted to the upstanding end 38 of the tube 14. The ball magazine 40 automatically feeds golf balls into the golf dispensing tube 14 as more clearly described in the Applicants' co-pending application Ser. No. 08/318,283 filed Nov. 14, 1994, which is incorporated by reference herein.

Referring now to FIG. 2, it will be observed that the lower tube segment 34 of the golf ball dispensing tube 14 extends across the sidewall 18 of the base 12 at about a 4° incline. Several golf balls 42 and 43 are shown positioned within the tube segment 34. The golf balls 42 and 43 are temporarily restrained from rolling to the end 36 of the tube segment 34 by a ball release mechanism which permits one ball at a time to be released for placement on the golf tee. The release mechanism comprises a plate 44 which is pivotally mounted on a pin 46 projecting from the base 12. The release plate 44 includes an arcuate edge 48 which extends into the tube segment 34 through a slot 50 formed in the tube segment 34. The curvature of the edge 48 substantially corresponds to the curvature of the golf ball 42. The leading end 52 of the arcuate edge 48 in the position shown in FIG. 2, extends sufficiently into the interior of the tube segment 34 to block the ball 42 from traversing down the tube segment 34. A weight 54 cantilevered on an arm 56 connected to the plate 44 retains the plate 44 in the blocking position. The golf ball 42 may be released and permitted to roll to the discharge end 36 of the tube segment 34 by moving the lever 58 downward thereby pivoting the plate 44 clockwise and thus raising the forward end 52 to release the ball 42, while simultaneously lowering the trailing end 60 of the arcuate edge 48 into the tube segment 34 for blocking the forward advance of the adjacent ball 43 while the ball 42 is released. The golfer may move the lever 58 by placing the head of his golf club on the lever 58. Release of weight on the lever 58 by removing the golf club head permits the weight 54 to rotate the plate 44 to its initial blocking position as shown in FIG. 2 and releasing ball 43 to advance forward and into engagement with the edge 52 of the plate 44.

The tube segment 34 includes a longitudinal slot 62 which extends about ¾ of the length of the tube segment 34 terminating at the discharge ends 36. The slot 62 permits the golfer to visually determine whether all of the golf balls within the dispensing tube 14 have been released.

Referring now collectively to FIG. 1 and FIGS. 5-7, the conveyor tube 64 of the invention is shown in greater detail. The conveyor tube 64 provides a conduit for each released golf ball 42 to be placed on the golf tee. A pair of spaced hinge brackets 66 suspend the conveyor tube 64 below and perpendicular to the tube segment 34. The conveyor tube 64 is pivotally supported on the hinge brackets 66 by a pivot pin 68 extending through the conveyor tube 64. The conveyor tube 64 is counterweighted so that the end near the pivot pin 68 is the heavier end thereby maintaining the conveyor tube 64 in an upright orientation as shown in FIG. 1 until a golf ball enters the conveyor or tube 64.

Referring now to FIG. 5, the conveyor tube 64 includes a ball opening 70 extending through the upper surface of the conveyor tube 64. In the upright orientation of the conveyor tube 64 shown in FIG. 1, the ball opening 70 is in alignment with the discharge end 36 of the tube segment 34 thereby providing a passageway for the golf ball to drop into the conveyor tube 64. The opening 70 is partially obstructed within the conveyor tube 64 by an inclined ball ramp 72 which seals off the counter balanced end of the conveyor tube 64. The ramp 72 provides a guide for the golf ball when it drops into the tube 64, directing it toward the exit end 73 of the conveyor tube 64.

The conveyor tube 64 is balanced about the pivot pin 68 to maintain the upright position shown in FIG. 1. However, the weight of the golf ball entering the conveyor tube 64 through the opening 70 unbalances the weight distribution of the conveyor tube 64 so that it pivots downwardly as the golf ball rolls toward the discharge end 73 of the conveyor tube 64. The discharge end 73 of the conveyor tube 64 is provided with a ground engaging extension 74. The extension 74 is approximately equal to the height of the golf tee.

The golf ball rolls down the conveyor tube 64 and drops out of the discharged end onto the golf tee. Additionally, the golf balls may also be delivered to the tufted surface of the platform of the practice station. Once the weight of the golf ball is removed from the conveyor tube 64, it automatically begins to pivot upwardly to its upright position shown in FIG. 1.

Counterweight is also provided on the conveyor tube 64 by a fin 76, in addition to weighted material filling the end of the conveyor tube 64 adjacent the pivot pin 68. In addition to acting as a counterweight, the fin 76 also acts as a ball stop for any balls which may be inadvertently released in the tube segment 34 while a ball is in the conveyor tube 64. This is accomplished by providing the discharge end 36 of the tube segment 34 with a transverse slot 78 across the discharge opening of the tube segment 34. As the conveyor tube 64 rotates downwardly to place a ball on the tee, the fin 76 rotates up and advances into the slot 78 thereby blocking the discharge opening of the tube segment 34. Any balls which may be inadvertently released, are stopped by the fin 76.

While the foregoing is directed to the preferred embodiment of the present invention, other and further embodiments of the invention may be devised without departing from the basic scope thereof, and the scope thereof is determined by the claims which follow.

What is claimed is:

1. A golf ball dispensing apparatus, comprising:
   (a) a base;
   (b) a ball dispensing tube mounted on said base, the ball dispensing tube have a transverse slot at a discharge end of the ball dispensing tube;
   (c) a ball conveyor tube pivotally connected to said ball dispensing tube, the ball conveyor tube having a fin which rotates upward and advances into the transverse slot in the ball dispensing tube as the ball conveyor tube rotates downward; and
   (d) means for sequentially releasing balls from said dispensing tube for placement on a golf tee.

2. The apparatus of claim 1 wherein said golf dispensing tube comprises a unitary body defining an upright segment, a middle segment, and a lower segment.

3. The apparatus of claim 2 wherein the upright tube segment and the middle tube segment of said golf dispensing tube define an angle of approximately 97° in a vertical plane through the center line of the upright tube segment and the middle tube segment.

4. The apparatus of claim 3 wherein the middle tube segment of said dispensing tube extends downwardly from the upright tube segment at approximately 7° from the horizontal.

5. The apparatus of claim 4 wherein the middle tube segment and the lower tube segment of said golf dispensing tube define an angle of approximately 90° in a horizontal plane through the center line of the middle tube segment and the lower tube segment.

6. The apparatus of claim 5 wherein the lower tube segment of said golf dispensing tube extends from the middle tube segment approximately 4° below the horizontal.

7. The apparatus of claim 1 including a golf ball magazine removeably mounted on said ball dispensing tube.

8. The apparatus of claim 1 wherein said means for sequentially releasing golf balls from said dispensing tube comprises a release plate pivotally mounted on said base, said release plate including an arcuate edge which projects into the interior of said ball dispensing tube.

9. The apparatus of claim 8 wherein said release plate includes a leading end which extends into the interior of said ball dispensing tube to block the travel of a golf ball through said golf dispensing tube, and further includes a trailing end which pivots into blocking engagement of an adjacent golf ball upon rotation of the release plate to release the first blocked golf ball.

10. The apparatus of claim 9 including lever means connected to said release plate for pivotally moving said release plate from a first blocking position to a second blocking position.

11. The apparatus of claim 1 including bracket means for pivotally supporting said ball conveyor tube at the discharge end of said ball dispensing tube.

12. The apparatus of claim 11 wherein said ball conveyor tube includes a ball opening in alignment with the discharge end of said ball dispensing tube for the golf ball to enter said ball conveyor tube.

13. The apparatus of claim 12 wherein said ball conveyor tube includes a guide ramp for directing a golf ball toward an exit end of said ball conveyor tube.

14. The apparatus of claim 13 wherein said ball conveyor tube is counter balanced so that said conveyor tube extends upwardly in a first position and pivots downwardly upon entry of a golf ball through said ball opening permitting the golf ball to roll toward the exit end of said ball conveyor tube.

15. The apparatus of claim 14 wherein said ball conveyor tube includes a ground engaging extension projecting from the exit end of said ball conveyor tube, said extension being approximately equal to the height of a golf tee.

\* \* \* \* \*